(12) United States Patent  
Tanaka et al.

(10) Patent No.: US 7,952,473 B2  
(45) Date of Patent: May 31, 2011

(54) LIQUID LEVEL DETECTING APPARATUS

(75) Inventors: Kenichi Tanaka, Shimada (JP);  
Yasunori Kawaguchi, Shimada (JP);  
Toshio Oike, Shimada (JP)

(73) Assignee: Yazaki Corporation, Tokyo (JP)

( * ) Notice: Subject to any disclaimer, the term of this patent is extended or adjusted under 35 U.S.C. 154(b) by 255 days.

(21) Appl. No.: 12/122,761

(22) Filed: May 19, 2008

(65) Prior Publication Data

US 2008/0309471 A1 Dec. 18, 2008

(30) Foreign Application Priority Data

Jun. 13, 2007 (JP) .................. 2007-156479

(51) Int. Cl.  
*B60Q 1/00* (2006.01)  
*G08B 21/00* (2006.01)

(52) U.S. Cl. ............... 340/450.2; 340/451; 340/618; 340/623; 340/612; 340/450

(58) Field of Classification Search ............. 340/714  
See application file for complete search history.

(56) References Cited

U.S. PATENT DOCUMENTS

| | | | |
|---|---|---|---|
| 4,768,377 A | | 9/1988 | Habelmann et al. |
| 4,782,699 A | | 11/1988 | Gonze |
| 5,172,007 A | | 12/1992 | Lumetta et al. |
| 5,814,830 A | * | 9/1998 | Crowne .................. 250/577 |
| 5,982,290 A | * | 11/1999 | Berger et al. ............. 340/618 |
| 6,502,461 B2 | * | 1/2003 | Keller ...................... 73/305 |
| 6,714,138 B1 | * | 3/2004 | Turner et al. ............. 340/854.3 |
| 6,724,201 B2 | * | 4/2004 | Sato et al. ................ 324/714 |
| 7,129,832 B2 | * | 10/2006 | Sabatino .................. 340/511 |
| 2004/0149032 A1 | * | 8/2004 | Sell ........................ 73/304 C |
| 2007/0079653 A1 | * | 4/2007 | Zuleta et al. ............. 73/304 R |

FOREIGN PATENT DOCUMENTS

| | | |
|---|---|---|
| DE | 35 40 806 A1 | 5/1987 |
| JP | 2002-214023 A | 7/2002 |
| JP | 2003-65827 A | 3/2003 |
| JP | 2006-214828 A | 8/2006 |

* cited by examiner

*Primary Examiner* — Daniel Wu  
*Assistant Examiner* — Pameshanand Mahase  
(74) *Attorney, Agent, or Firm* — Sughrue Mion, PLLC

(57) ABSTRACT

A liquid level detecting apparatus includes a liquid level sensor of a variable resistance type which includes a sliding contact and a resistor, and which detects a resistance change corresponding to a change of a liquid level of a liquid in a tank and outputs a detection signal based on the change of the liquid level when the liquid level sensor is energized and a controlling unit which controls to supply energization pulses periodically to the liquid level sensor, and controls a displaying portion to display a remaining amount of the liquid in the tank, on the basis of the detection signal output from the liquid level sensor. The controlling unit changes a number of the energization pulses supplied to the liquid level sensor in a predetermined time, on the basis of the detection signal output from the liquid level sensor.

3 Claims, 6 Drawing Sheets

LIQUID LEVEL DETECTING APPARATUS

BACKGROUND

The present invention relates to a liquid level detecting apparatus including a liquid level sensor of the variable resistance type which is to be disposed in a tank, and more particularly to a liquid level detecting apparatus which is suitable for detecting a remaining amount of a fuel containing alcohol stored in a fuel tank of a vehicle.

In a fuel tank of a vehicle which uses a liquid such as gasoline or light oil as a fuel, a liquid level sensor which detects a remaining amount of the fuel is disposed. As a liquid level sensor of this type, a sensor shown in FIGS. 5 and 6 is known (for example, see Patent Reference 1).

In the liquid level sensor 101 disclosed in Patent Reference 1, as shown in FIG. 5, a floats 103 is attached to the leading end of an arm 102, and the basal end side of the arm 102 is swingably supported by a frame 104. On the frame 104, a wiring board 105, and a sliding arm 106 which slides on the wiring board 105 in conjunction with the arm 102 are disposed.

As shown in FIG. 6, a first sliding portion 107 and a second sliding portion 110 are provided on the wiring board 105. The first sliding portion 107 includes plural first conductive segments 108 which are vertically arranged at intervals and a resistor 109 to which the plural first conductive segments 108 are connected. The second sliding portion 110 includes plural second conductive segments 111 which are vertically arranged at intervals and a conductive coupling portion 112 to which the plural second conductive segments 111 are connected. First and second contacts 113, 114 which are contacted with the first and second conductive segments 108, 111, respectively, and which are electrically connected to each other are disposed on the sliding arm 106.

When the arm 102 is swung in accordance with a displacement of the liquid level, and the sliding arm 106 is swung in conjunction with the swing, both the first conductive segment 108 with which the first contact 113 is contacted, and the second conductive segment 111 with which the second contact 114 is contacted are changed, so that the total length of the resistor 109 which is in the circuit between a connection land 115 of the first sliding portion 107 and a connection land 116 of the second sliding portion 110 is increased or decreased.

The connection land 115 of the first sliding portion 107 is connected to the plus side of a power supply system, and the connection land 116 of the second sliding portion 110 is connected to the minus (ground) side of the power supply system. When the circuit between the connection lands 115, 116 are energized, a detection signal (a resistance or a voltage) corresponding to a change of the resistance between the connection lands 115, 116 is output.

In the thus configured liquid level sensor 101, the rise and fall of the liquid level, and the increase and decrease of the resistance exhibit the same tendency. When the liquid level is raised, namely, the sliding arm 106 is swung toward the upper side in FIG. 6, and the total length of the resistor 109 which is in the circuit between the connection lands 115, 116 is decreased, whereby the resistance of the circuit between the connection lands 115, 116 is decreased.

Conversely, when the liquid level is lowered, the sliding arm 106 is swung toward the lower side in FIG. 6, and the total length of the resistor 109 which is in the circuit between the connection lands 115, 116 is increased, whereby the resistance of the circuit between the connection lands 115, 116 is increased. Then, the liquid level is detected on the basis of the change of the resistance. In FIG. 6, point F indicates the swung position of the sliding arm 106 in the case where the liquid level is at the full position, and point E indicates the swung position of the sliding arm 106 in the case where the liquid level is at the empty position.

In a liquid level detecting apparatus comprising the liquid level sensor 101 of the variable resistance type, the liquid level sensor 101 is always energized, a controlling device (for example, a microcomputer) samples the detection signal of the liquid level sensor 101 at regular intervals, and controls a fuel meter to display the remaining amount.

Recently, techniques in which alcohol (ethanol or methanol) is mixed with a main fuel such as gasoline or light oil, or in which alcohol itself is used as a main fuel are studied. Alcohol is an electrolyte solution. When a liquid level sensor of the variable resistance type is immersed in an electrolyte solution, there is a possibility that electrolytic corrosion occurs, and metals of the plus electrode (conductor) are eluted with the fuel by electrolysis, so that the resistance of the conductor is increased. By contrast, plus ions in the fuel precipitate on the minus electrode (conductor), and the contact resistance with respect to the sliding contact is increased. Therefore, a conventional liquid level sensor such as the above-described liquid level sensor 101 of the variable resistance type tends to cause a failure in indication of the remaining amount.

In order to suppress the influences of electrolytic corrosion, it is effective to shorten the energization time of the liquid level sensor. Patent Reference 2 and 3 disclose examples of a technique in which the energization time is shortened.

For example, Patent Reference 2 discloses a liquid level detecting apparatus comprising: a liquid level detecting portion which includes at least partly an electrolytic corrosive member, and which is disposed in a liquid storage tank to detect the level of a liquid; and a controlling portion for controlling the liquid level detecting portion to intermittently operate (operate only during a predetermined time at each predetermined period).

Patent Reference 3 discloses an apparatus in which a switching circuit for controlling energization is disposed in a power supply circuit, and a liquid level sensor is intermittently energized at a constant period.

[Patent Reference 1] JP-A-2003-65827
[Patent Reference 2] JP-A-2006-214828
[Patent Reference 3] JP-A-2002-214023

However, although the liquid level sensor is intermittently energized, both the conventional apparatuses disclosed in Patent References 2 and 3 are not configured so that the energization time is changed according to the situation. Depending on the manner of setting the energization time, there still remain possibilities that the accuracy of detecting the liquid amount is lowered, and that a high effect of preventing electrolytic corrosion from occurring cannot be attained.

SUMMARY

The invention has been conducted in view of the above-discussed circumstances. It is an object of the invention to provide a liquid level detecting apparatus in which, even in the case where the apparatus is used while immersing a liquid level sensor in a liquid containing an electrolyte solution such as alcohol, influences of electrolytic corrosion can be suppressed as far as possible, and a high accuracy of detecting a liquid level can be ensured.

The object of the invention can be achieved by the following configurations.

(1) A liquid level detecting apparatus comprises:

a liquid level sensor of a variable resistance type which includes a sliding contact and a resistor, and which detects a resistance change corresponding to a change of a liquid level of a liquid in a tank and outputs a detection signal based on the change of the liquid level when the liquid level sensor is energized; and a controlling unit which controls to supply energization pulses periodically to the liquid level sensor, and controls a displaying portion to display a remaining amount of the liquid in the tank, on the basis of the detection signal output from the liquid level sensor, wherein the controlling unit changes a number of the energization pulses supplied to the liquid level sensor in a predetermined time, on the basis of the detection signal output from the liquid level sensor.

(2) Preferably, the controlling unit sets a first number of the energization pulses when the detection signal falls within a first range corresponding to a first set value which indicates that the liquid level is in a vicinity of a highest position, and sets a second number of the energization pulses when the detection signal falls within a second range corresponding to a second set value which indicates that the liquid level is in a vicinity of a lowest position. The first number of the energization pulses is greater than the second number of the energization pulses.

(3) Preferably, the controlling unit sets a third number of the energization pulses when the detection signal falls within a third range corresponding to a third set value which indicates that the liquid level is in a vicinity of an intermediate position. The third number of the energization pulses is set between the first number of the energization pulses and the second number of the energization pulses.

According to the liquid level detecting apparatus having the configuration of (1) above, the number of the energization pulses supplied in the predetermined time is changed on the basis of the detection signal output from the liquid level sensor. In accordance with the situation of the remaining liquid amount, therefore, the optimum number of the energization pulses can be set, and both the improvement of the electrolytic corrosion resistance, and that of the detection accuracy of the liquid level can be attained.

According to the liquid level detecting apparatus having the configuration of (2) above, in the vicinity of point F, the number of the energization pulses supplied in the predetermined time is increased, and, in the vicinity of point E, that of the energization pulses supplied in the predetermined time is decreased. In the vicinity of point F where the tendency of electrolytic corrosion is low, therefore, the energization time can be prolonged, so that the detection accuracy can be enhanced, and, in the vicinity of point E where the tendency of electrolytic corrosion is high, the energization time can be shortened, so that the electrolytic corrosion resistance can be improved.

According to the liquid level detecting apparatus having the configuration of (3) above, at the intermediate point (for example, at point ½), the energization time is further set to an intermediate value between points F and E. Therefore, it is possible to more finely cope with the situation, so that the electrolytic corrosion resistance can be improved and the detection accuracy can be enhanced.

According to the invention, even in the case where the apparatus is used while immersing a liquid level sensor in a liquid containing an electrolyte solution such as alcohol, influences of electrolytic corrosion can be suppressed as far as possible, and a high accuracy of detecting a liquid level can be ensured.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Hereinafter, a preferred embodiment of the invention will be described in detail with reference to the accompanying drawings.

Figure 1:
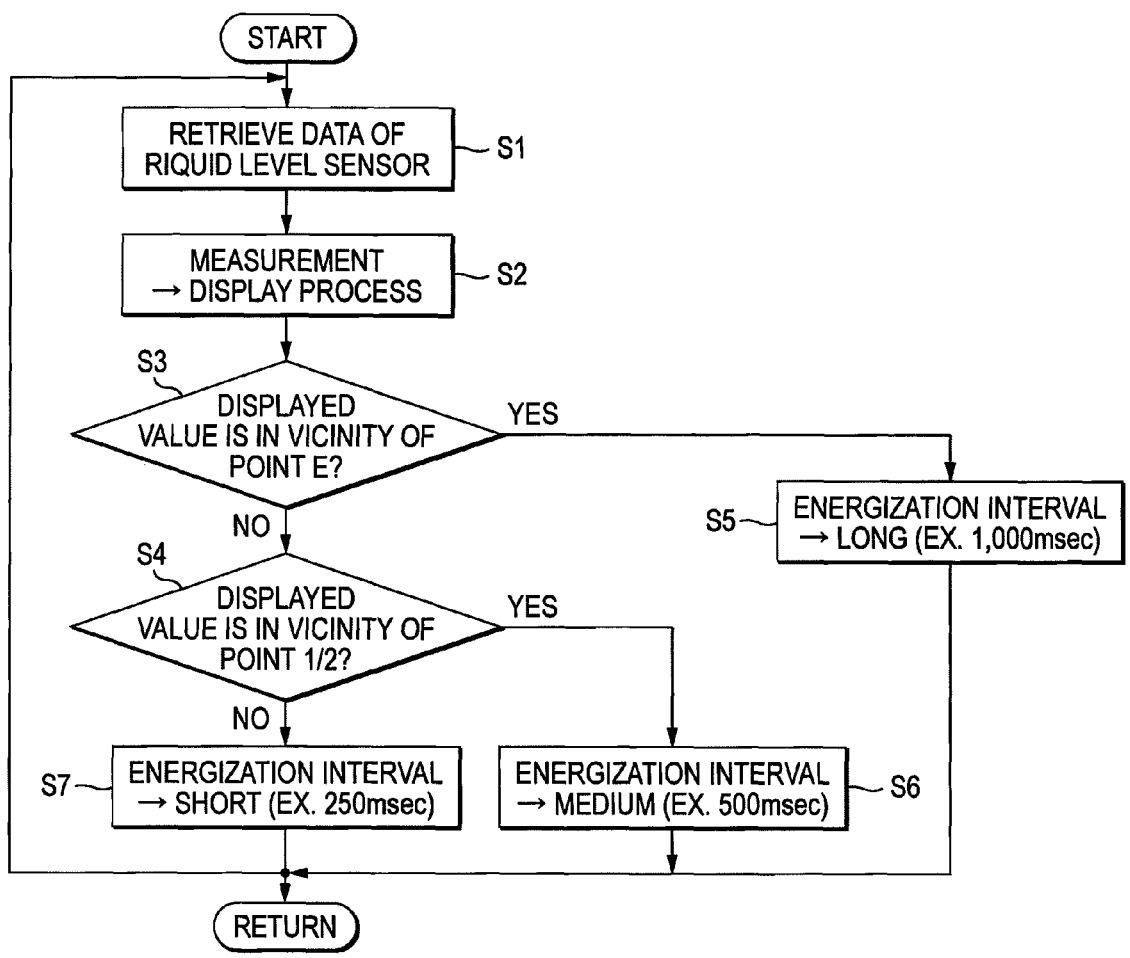
FIG. 1 is a flowchart showing contents of a control process in a liquid level detecting apparatus of an embodiment of the invention.
Figure 2:
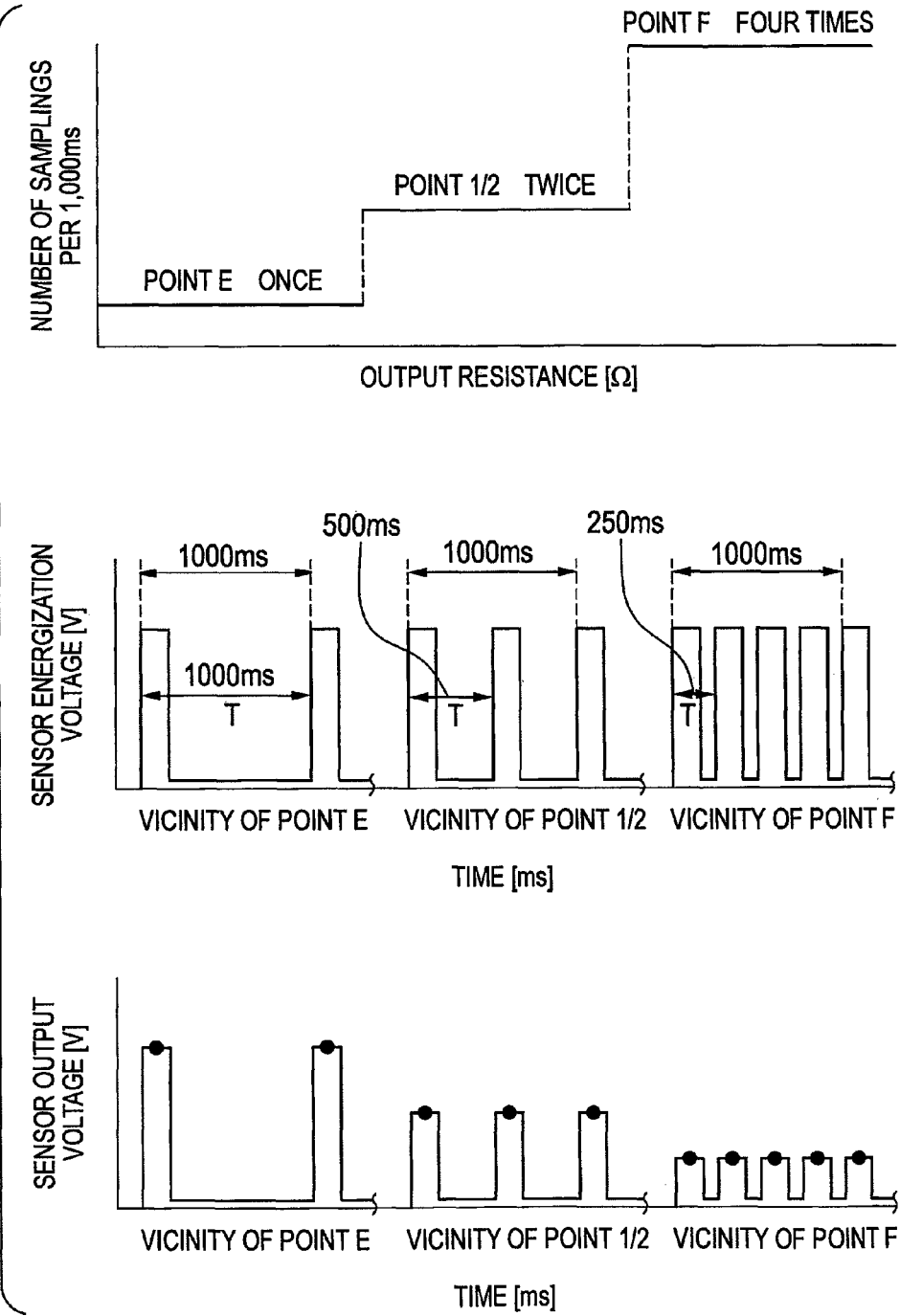
FIG. 2 is a timing chart showing contents of control processes performed in the vicinities of point E, point ½, and point F in the embodiment.
Figure 3:
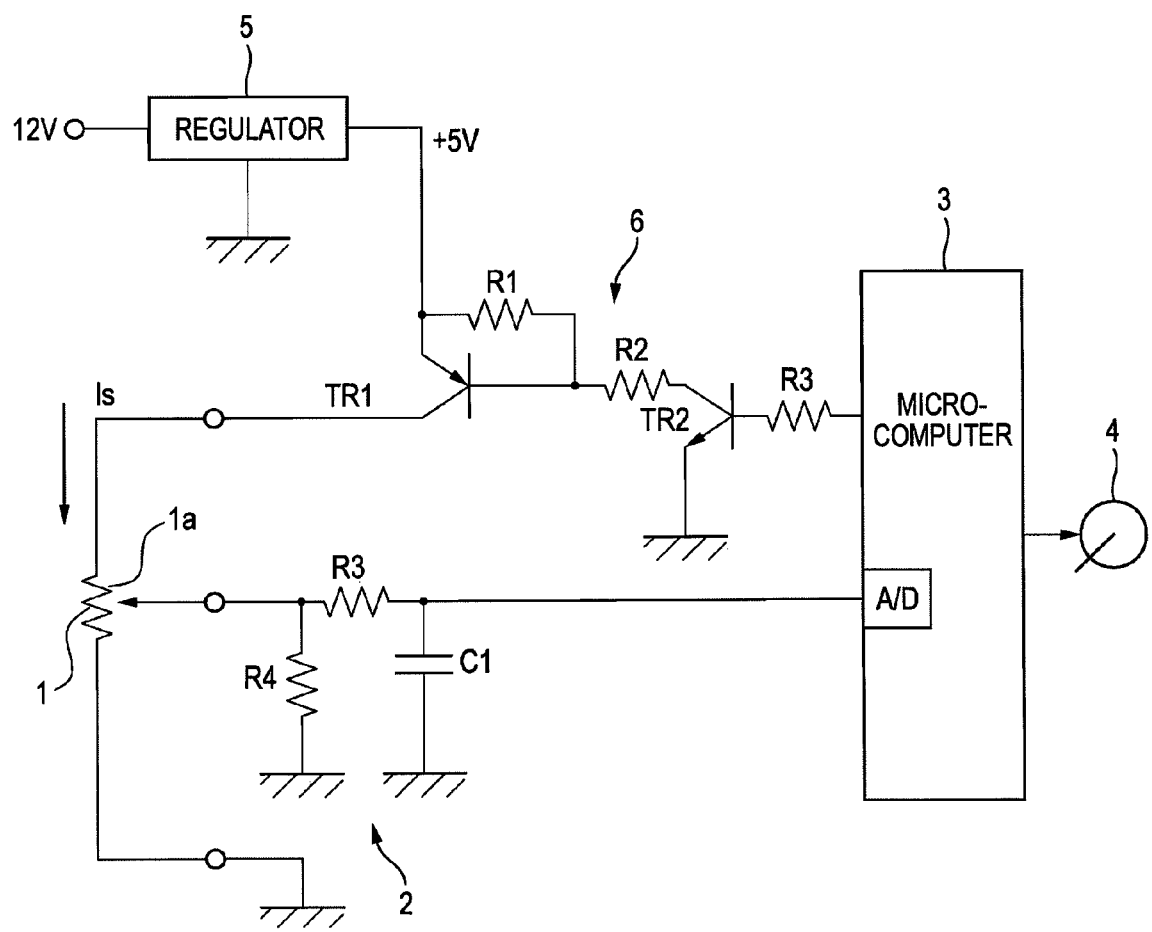
FIG. 3 is a circuit diagram showing the configuration of a control system of the liquid level detecting apparatus of the embodiment.
Figure 4:
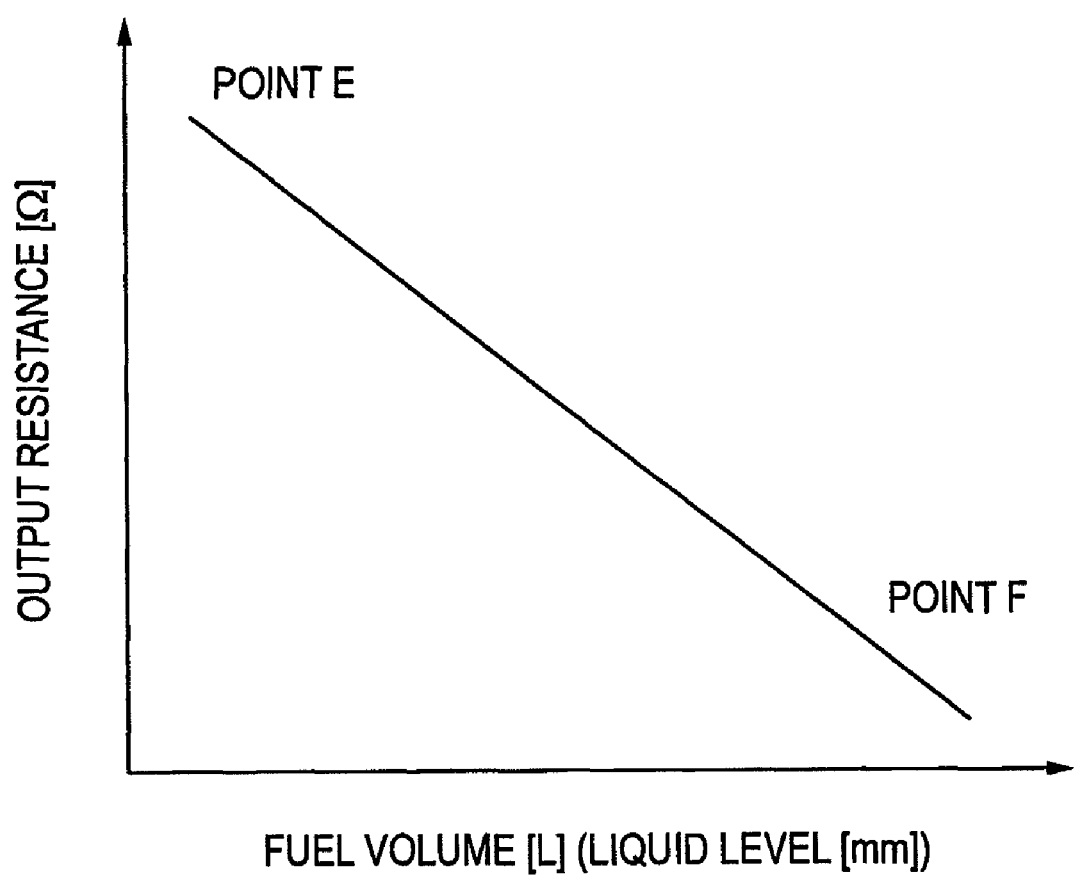
FIG. 4 is a characteristic diagram showing a relationship of the output resistance of a liquid level sensor and the fuel volume (liquid level) in the embodiment.

FIG. 1 is a flowchart showing contents of a control process in a liquid level detecting apparatus of the embodiment of the invention, FIG. 2 is a timing chart showing contents of control processes performed in the vicinities of point E, point ½, and point F in the embodiment, FIG. 3 is a circuit diagram showing the configuration of a control system of the liquid level detecting apparatus of the embodiment, and FIG. 4 is a characteristic diagram showing a relationship of the output resistance of the liquid level sensor and the fuel volume (liquid level) in the embodiment.

The liquid level detecting apparatus has: a liquid level sensor of the variable resistance type which comprises a sliding contact and a resistor, and which, when energized, detects a resistance change corresponding to a change of the liquid level of a liquid in a tank, and outputs a detection signal; and a controlling unit which performs an energization control in which energization pulses are periodically supplied to the liquid level sensor, and a display control of controlling a displaying portion to display the remaining amount of the liquid in the tank, on the basis of the detection signal output from the liquid level sensor.

Figure 5:
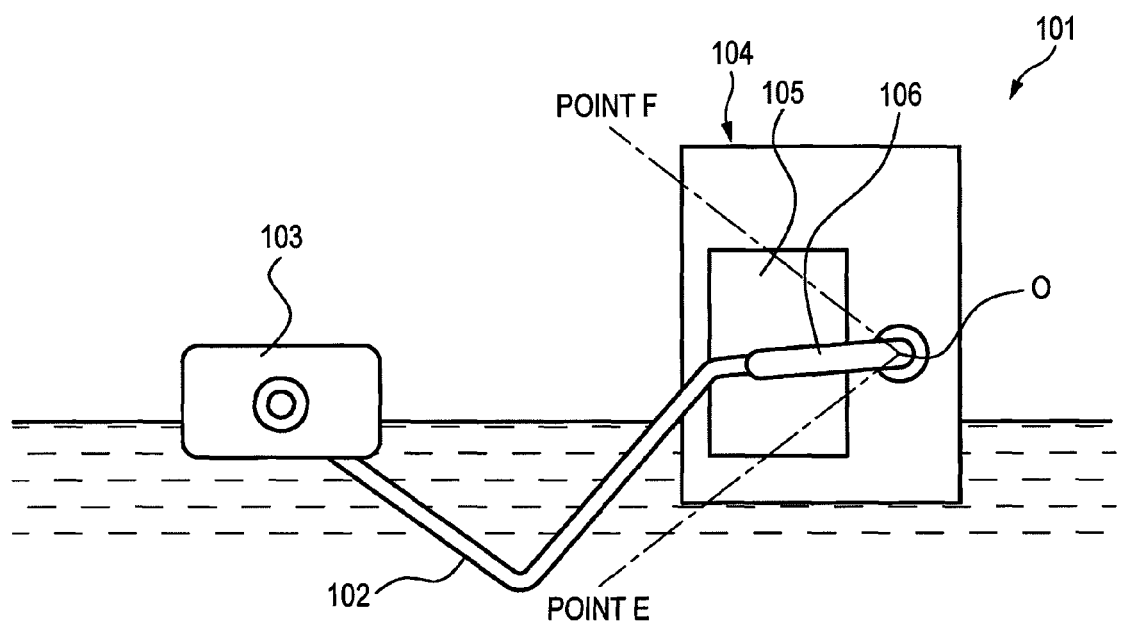
FIG. 5 is a diagram of a conventional liquid level sensor.
Figure 6:
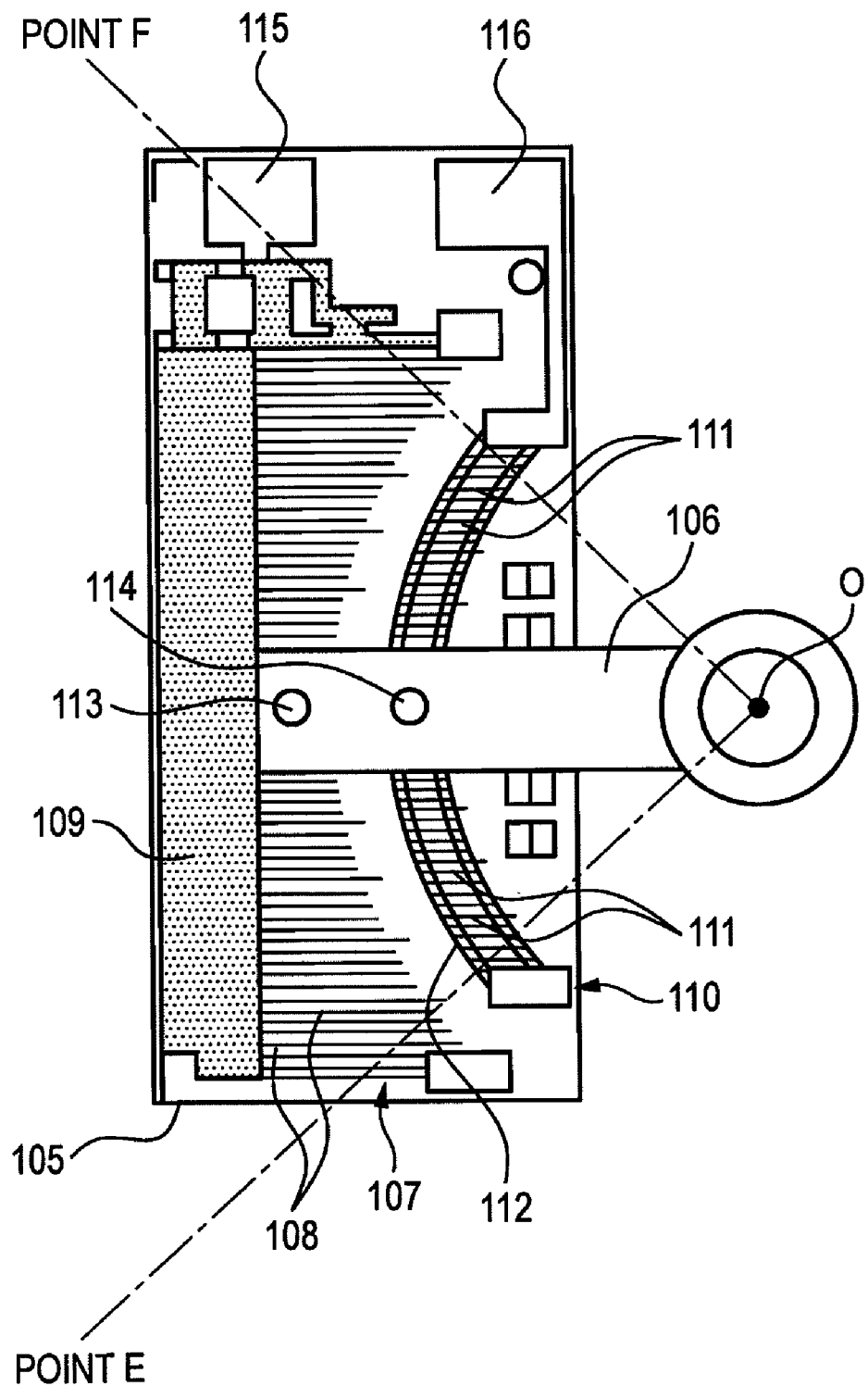
FIG. 6 is a view showing the internal configuration of the conventional liquid level sensor.

As the liquid level sensor, a sensor similar to that shown in FIGS. 5 and 6 can be adequately employed. Therefore, portions common to those which have been described are denoted by the same or equivalent reference numerals, and duplicated description will be omitted.

In the liquid level detecting apparatus, components which may be possibly electrolytically corroded are the first and second contacts 113, 114 which are disposed as a sliding contact, the first conductive segments 108 with which the first contact 113 is contacted and slid, the second conductive segments 111 with which the second contact 114 is contacted and slid, the connection lands 115, 116 and the like (see FIG. 6).

The output resistance (or the output voltage) of the liquid level sensor and the fuel volume have an inversely proportional relationship as shown in FIG. 4. In the liquid level detecting apparatus of the embodiment, in order to prevent the above-mentioned component from being electrolytically corroded, the controlling unit performs the following control.

The controlling unit changes the number of energization pulses supplied to the liquid level sensor in a predetermined time, on the basis of the detection signal output from the liquid level sensor, and simultaneously changes the sampling interval of the detection signal of the liquid level sensor. From the detection signal which is supplied at this time, then, the controlling unit calculates the fuel volume on the basis of the relationship shown in FIG. 4, and controls a display portion to indicate the remaining amount (fuel volume) of the liquid in the tank.

As a result of intensive study conducted by the present inventors, conditions under which the components in the liquid level sensor tends to be subjected to electrolytic corrosion have been found. The conditions are listed in (I) to (III) below.

(I) The potential difference between the plus and minus sides is large. In the vicinity of point E, for example, the resistance of the liquid level sensor is high, and hence the potential difference is large, so that electrolytic corrosion easily advances.

(II) The energization time is long.

(III) The temperature of the fuel is high. When the liquid level becomes close to point E (when the remaining amount of the fuel is reduced), for example, the temperature of the stored fuel tends to be raised. When the temperature is high, electrolytic corrosion easily advances.

When the energization time is long, furthermore, electrolytic corrosion easily advances. When energization is intermittently performed, the energization time can be shortened, and hence the advancement of electrolytic corrosion can be suppressed. In the case of a simple countermeasure in which energization is intermittently performed, the sampling interval is widened, whereby the responsivity of the meter indication is lowered by liquid level fluctuation.

In the embodiment, therefore, the control is performed in principle in contents of (a) and (b) as follows:

(a) the energization time in the side of point E where the electrolytic corrosion tendency tends to be large, liquid level fluctuation tends to be small, and the fuel temperature tends to be high is prolonged; and (b) the energization time in the side of point F where the electrolytic corrosion tendency tends to be small, liquid level fluctuation tends to be large, and the fuel temperature tends to be low is shortened. Therefore, the electrolytic corrosion resistance of the components of the liquid level sensor which is disposed in the tank is improved while the accuracy of detecting the level of the fuel in the tank is ensured and the responsivity of the meter indication against liquid level fluctuation is ensured.

Specifically, for example, the energization time (the number of energization pulses per unit time) and the sampling interval are changed in three steps (vicinities of point E, point ½, and point F) with respect to the liquid level.

In this case, the step number and the energization/sampling interval may be adjusted in accordance with the alcohol concentration of the fuel and the accuracy of the meter indication.

The number of energization pulses is changed in the following manner.

In the case where the detection signal output from the liquid level sensor is in a predetermined region with respect to a first set value (point F) indicating that the liquid level is in the vicinity of the highest position, the number of the energization pulses supplied in a predetermined time is increased as compared with the case where the detection signal is in a predetermined region with respect to a second set value (point E) indicating that the liquid level is in the vicinity of the lowest position.

In the case where the detection signal output from the liquid level sensor is in a predetermined region with respect to a third set value (point ½) indicating that the liquid level is in the vicinity of an intermediate position, the number of the energization pulses supplied in a predetermined time is set to be smaller than the number of the energization pulses supplied in the predetermined time in the case where the detection signal is in the predetermined region with respect to the first set value (point F), and also to be larger than the number of the energization pulses supplied in the predetermined time in the case where the detection signal is in the predetermined region with respect to the second set value (point E).

The contents of the changes of the number of the energization pulses are organized in Table 1 below.

TABLE 1

| | Poten- | Tendency | | |
| | tial difference | Level fluctuation | Fuel temp. | Energization/sampling interval |
| --- | --- | --- | --- | --- |
| Point F | Small | Large | Low | Electrolytic corrosion tendency is small, intermittent interval is narrowed in order to enhance level responsivity |
| (Point 1/2) | ↑↓ | ↑↓ | ↑↓ | ↑↓ |
| Point E | Large | Small | High | Electrolytic corrosion tendency is large, intermittent interval is widened (non-energization time is prolonged) |

Next, the embodiment will be described by way of specific examples of the configuration and the control.

FIG. 3 is a circuit diagram of a control system. In the circuit diagram, a fuel sender (liquid level sensor) 1 is indicated as a resistor in which a voltage is applied to one end and the other end is connected to the ground, and comprises a sliding contact 1a (corresponding to the first contact (113) and the second contact (114) in FIG. 6) from which a voltage signal is taken out. The sliding contact 1a is connected to an A/D converter which is in an analog port of a microcomputer (controlling unit) 3, through an integrating circuit 2 configured by resistors R3, R4 and a capacitor C1.

A sender current Is flows through the fuel sender 1 by applying the voltage to the one end of the fuel sender 1, and a voltage signal corresponding to the liquid level appears between the sliding contact 1a and the ground. The microcomputer 3 A/D-converts the voltage signal which is taken in through the integrating circuit 2, and, in the illustrated example, calculates the liquid level from the A/D-converted value on the basis of the relationship shown in FIG. 4. Based on the calculation result, a pointer of a fuel meter (displaying portion) 4 is driven to display the remaining amount of the liquid.

When the automobile vibrates, the liquid level in the tank fluctuates. The integrating circuit 2 is disposed in order to smooth the fluctuation components caused by a vibration of the automobile.

A switching circuit 6 which turns on and off the applied voltage is disposed between the one end of the fuel sender 1 and a regulator 5 for generating a stabilized voltage of 12 to 5 V. Specifically, the emitter of a transistor TR1 is connected to the output end of the regulator 5, and the collector of the transistor TR1 is connected to the one end of the fuel sender 1. The base of the transistor TR1 is connected to the emitter through a resistor R1, and also to the collector of a transistor TR2 through a resistor R2. The base of the transistor TR2 is connected to the microcomputer 3 through a resistor R3, and the emitter is connected to the ground. In the switching circuit 6, when the transistor TR2 is turned on, the base potential of the transistor TR1 is lowered, and the transistor TR1 performs the on operation to connect the power source output end of the regulator 5 to the one end of the fuel sender 1. Therefore, the sender current Is flows through the fuel sender 1.

Conversely, when the transistor TR2 is turned off, the base potential of the transistor TR1 is raised, and the transistor TR1 performs the off operation to break the connection between the power source output end of the regulator 5 and the one end of the fuel sender 1. Therefore, the sender current Is does not flow through the fuel sender 1. In order to realize the above-mentioned change of the number of the energization pulses, the microcomputer 3 controls the transistor TR2, i.e., the transistor TR1 so as to be on/off-operated. Therefore, the rectangular pulse-like sender current Is flows through the fuel sender 1 at instructed intervals. In synchronization with the on timing of the transistor TR1, the microcomputer 3 samples the output voltage of the integrating circuit 2, and A/D-converts the sampled voltage. As a result, it is possible to obtain an accurate A/D-converted value.

Next, the flow of the control will be described with reference to a flowchart.

When the process is started, the microcomputer 3 retrieves data (the detection signal) of the liquid level sensor in step S1, and subjects the retrieved data to a measurement process in step S2 to display the result of the process on the displaying portion (display process).

Next, it is determined in step S3 whether or not the displayed value (liquid level) is in a predetermined region in the vicinity of point E (Empty). If No, it is determined in step S4 whether or not the displayed value (liquid level) is in a predetermined region in the vicinity of point ½ (intermediate point). If the displayed value is in the predetermined region in the vicinity of point E, the process proceeds to step S5 to set the energization interval to be long (for example, 1,000 ms). If the displayed value is in the predetermined region in the vicinity of point ½, the process proceeds to step S6 to set the energization interval to be medium (for example, 500 ms). If the displayed value is in the predetermined region in the vicinity of point F (Full), both the determinations of steps S3 and S4 are No, and the process proceeds to step S7 to set the energization interval to be short (for example, 250 ms).

In the case where the determination of step S3 is performed based on the output resistance, when it is assumed that the whole range of the output resistance is 15 to 410Ω, for example, the determination is performed under the conditions of "output resistance of liquid level sensor>250Ω". In step S4, similarly, the determination is performed under the conditions of "output resistance of liquid level sensor>100Ω".

When the processes of steps S5 to S7 are ended, the process returns to step S1.

As shown in FIG. 2, the unit time is set to 1,000 ms. In the vicinity of point E, when the energization interval T is 1,000 ms, the number of energization pulses is one. In the vicinity of point ½, when the energization interval T is 500 ms, the number of energization pulses is two. In the vicinity of point F, when the energization interval T is 250 ms, the number of energization pulses is four. The sampling number is changed in the same manner as the number of energization pulses.

As described above, according to the embodiment, the controlling unit 3 changes the number of the energization pulses supplied in a predetermined time, on the basis of the detection signal output from the liquid level sensor 1. In accordance with the situation of the remaining liquid amount, therefore, the optimum number of the energization pulses can be set, and both the improvement of the electrolytic corrosion resistance, and that of the detection accuracy can be attained.

According to the embodiment, in the vicinity of point F, the controlling unit 3 increases the number of the energization pulses supplied in the predetermined time, and, in the vicinity of point E, decreases the number of the energization pulses supplied in the predetermined time. In the vicinity of point F where the tendency of electrolytic corrosion is low, therefore, the energization time can be prolonged, so that the detection accuracy can be enhanced, and, in the vicinity of point E where the tendency of electrolytic corrosion is high, the energization time can be shortened, so that the electrolytic corrosion resistance can be improved.

According to the embodiment, furthermore, at point ½, the energization time is set to an intermediate value between points F and E. Therefore, it is possible to more finely cope with the situation, so that the electrolytic corrosion resistance can be improved and the detection accuracy can be enhanced.

The invention is not restricted to the above-described embodiment, and modifications, improvements, and the like can be adequately performed. Moreover, the materials, shapes, dimensions, numbers, installation places, and the like of the components are arbitrarily set as far as the invention can be attained, and not particularly restricted.

What is claimed is:

1. A liquid level detecting apparatus comprising:
   a liquid level sensor of a variable resistance type which includes a sliding contact and a resistor, and which detects a resistance change corresponding to a change of a liquid level of a liquid in a tank and outputs a detection signal based on the change of the liquid level when the liquid level sensor is energized; and
   a controlling unit which controls to supply energization pulses periodically to the liquid level sensor, and controls a displaying portion to display a remaining amount of the liquid in the tank, on the basis of the detection signal output from the liquid level sensor,
   wherein the controlling unit changes a number of the energization pulses supplied to the liquid level sensor in a predetermined time, on the basis of the detection signal output from the liquid level sensor.

2. The liquid level detecting apparatus according to claim 1, wherein the controlling unit sets a first number of the energization pulses when the detection signal falls within a first range corresponding to a first set value which indicates that the liquid level is in a vicinity of a highest position, and sets a second number of the energization pulses when the detection signal falls within a second range corresponding to a second set value which indicates that the liquid level is in a vicinity of a lowest position; and
   wherein the first number of the energization pulses is greater than the second number of the energization pulses.

3. The liquid level detecting apparatus according to claim 2, wherein the controlling unit sets a third number of the energization pulses when the detection signal falls within a third range corresponding to a third set value which indicates that the liquid level is in a vicinity of an intermediate position; and
   wherein the third number of the energization pulses is set between the first number of the energization pulses and the second number of the energization pulses.

* * * * *